United States Patent [19]
Fetzer

[11] Patent Number: 6,077,001
[45] Date of Patent: Jun. 20, 2000

[54] DRILLING DEVICE

[75] Inventor: Gerhard Fetzer, Mühlacker, Germany

[73] Assignee: Johann Eberhard GmbH, St. Josef, Austria

[21] Appl. No.: 09/155,996

[22] PCT Filed: Jan. 20, 1998

[86] PCT No.: PCT/DE98/00160

§ 371 Date: Oct. 8, 1998

§ 102(e) Date: Oct. 8, 1998

[87] PCT Pub. No.: WO98/36144

PCT Pub. Date: Aug. 20, 1998

[30] Foreign Application Priority Data

Feb. 12, 1997 [DE] Germany .......................... 297 02 379 U
Mar. 20, 1997 [DE] Germany .......................... 297 05 088 U

[51] Int. Cl.[7] .................................................. B23B 47/28
[52] U.S. Cl. ........................................ 408/115 R; 408/72 R
[58] Field of Search .............................. 408/72 R, 115 R, 408/115 B, 112, 103, 110

[56] References Cited

U.S. PATENT DOCUMENTS

| D. 378,094 | 2/1997 | Eberhard . | |
|---|---|---|---|
| 2,889,633 | 6/1959 | Simon | 408/72 R |
| 2,920,509 | 1/1960 | Bennett | 408/72 R |
| 4,138,200 | 2/1979 | Nazarenus | 408/72 R |
| 4,391,558 | 7/1983 | Perry | 408/110 |
| 4,686,769 | 8/1987 | Röck et al. . | |
| 5,059,071 | 10/1991 | Ericksen . | |
| 5,076,742 | 12/1991 | Lee et al. | 408/112 |
| 5,146,961 | 9/1992 | Schoeller | 408/103 |
| 5,797,708 | 8/1998 | Bencic | 408/112 |

FOREIGN PATENT DOCUMENTS 28 41 200   4/1979   Germany .

*Primary Examiner*—Daniel W. Howell
*Attorney, Agent, or Firm*—Frishauf, Holtz, Goodman, Langer & Chick, P.C.

[57] ABSTRACT

The invention relates to a drilling device having a base plate and a positioning plate. The positioning plate bears a tool guide bush and two tool guide mechanisms for producing a principal drilled hole for the main body of a hinge, and two screw holes for the hinge fastening screws.

11 Claims, 3 Drawing Sheets

DRILLING DEVICE

The invention relates to a drilling device for doors, flaps or lids or the like. Such a drilling device is known.

Such drilling devices are used to enable mounting commercially available hinges that have a cup-shaped central body and two fastening arms adjoining them, the arms being drilled and each serving to receive a respective fastening screw that fixes the hinge to the door or the like.

In commercially available hinges, however, the problem of the variable design arises, with the effect that beginning at one edge of a door, the location of the main bore that receives the cup-shaped central body must be arranged in various ways. This is done by means of a stop adjustment that uses adjusting eccentric elements; known drilling devices are equipped with such a stop adjuster.

However, this does not solve a further problem, which is that in commercially available hinges the fastening arms can also be disposed in various ways with regard to the cup-shaped central body. The holes for screwing in the fastening screws for the hinge must therefore be especially drilled for various hinge shapes, this is time-consuming, inconvenient, and expensive.

The object of the invention is to overcome this disadvantage and to create a drilling device of the type defined at the outset which not only allows adjusting the location of the main bore that receives cup-shaped central body but also allows taking the various hinge designs into account, so that both the main bore and the screw holes for the hinge fastening screws can be made in a single operation. The time expenditure and expense should be reduced, and the work sequence should be simplified.

This object is attained in accordance with the invention by the characteristics of the main claim. Advantageous further features of the subject of claim 1 will become apparent from the characteristics of the dependent claims and from the specification and the drawing.

DRAWING

One exemplary embodiment of the invention is shown in the drawing and described in further detail in the ensuing description. Shown are:

FIG. 1, a front view of the drilling device;

FIG. 2, a view of the drilling device from above;

FIG. 3, a view of the drilling device from below;

FIG. 4, a front view of a tool guide carrier in section;

FIG. 5, a view of the carrier from above;

FIG. 6, a stop rod for the drilling device;

FIG. 7, a drilling aid; and

FIG. 8, a variant of the drilling aid of FIG. 7 in side view and back view.

DESCRIPTION OF THE EXEMPLARY EMBODIMENT

Figure 3:
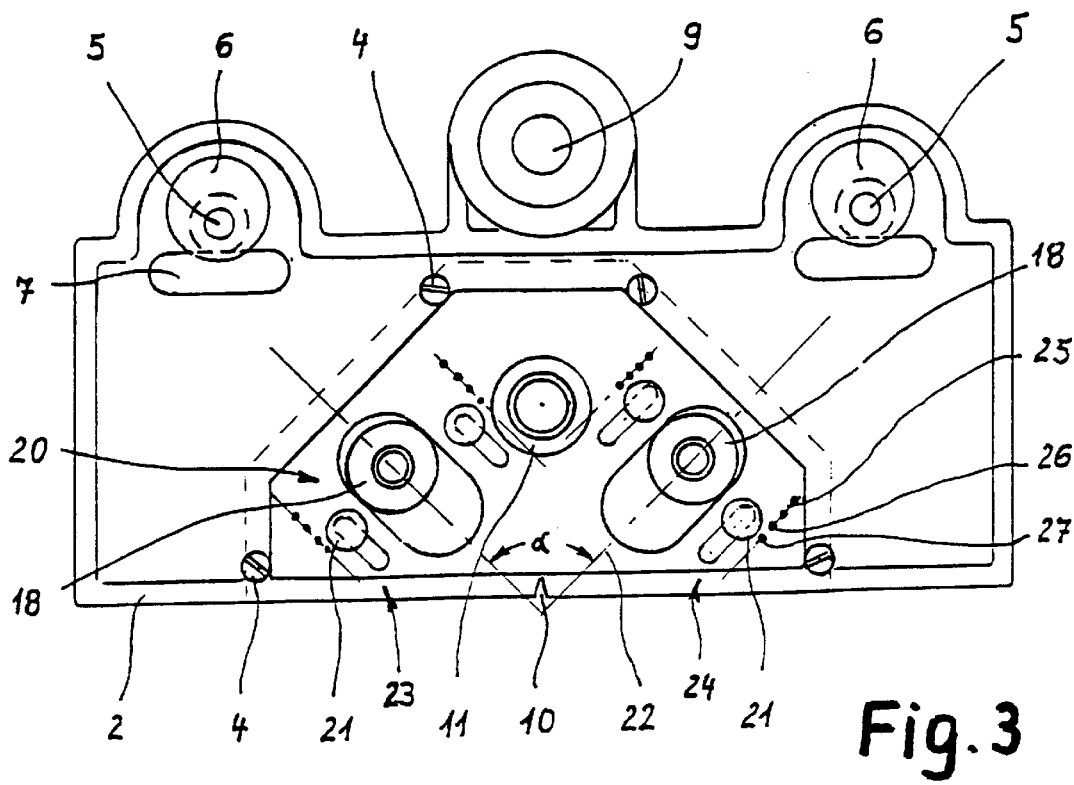

A drilling device 1 has a base plate 2 and a mounting plate 3, which is connected to the base plate 2 via four screws 4 (see FIG. 3).

The base plate 2 is provided with two bores 5, spaced apart by a relatively great distance, which are intended to receive two lever-actuated adjusting eccentrics 6. To monitor the setting of the adjusting eccentrics 6 at any time, each bore 5 is completed with a monitoring window 7. Provided between the two adjusting eccentrics 6 on the base plate 2 is a cylindrical protrusion 8 with a receiving bore 9, which is intended to receive a chucking device, not shown, of the drilling device 1.

On its long side opposite the receiving bore 9, the base plate 2 is provided with an adjusting notch 10, with which the correct alignment of the drilling device 1 with the workpiece to be machined can be monitored.

The mounting plate 3 secured to the base plate 2 has a central tool guide bush 11 in its middle for a miller-like drilling tool, not shown. Secured to a shaft 12 of the drilling tool is a cuff 13, which on the one hand serves as a bearing face for a restoring spring 14 but on the other also defines a working stroke of the drilling tool toward the bottom, by striking the mounting plate 3 when the restoring spring 14 is compressed. The cuff 13 is adjustable on the shaft 12 in order to vary the working stroke of the drilling tool. On its top, the cuff 13 has a polygonal recess 15 for engagement by a corresponding polygonal pin, which can be connected for drive purposes to a drill spindle of a drilling machine. However, the polygonal pin and the drill spindle are not shown in the drawing because they are not essential to the invention.

Figure 4:
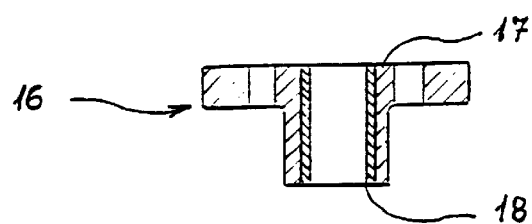
Figure 5:
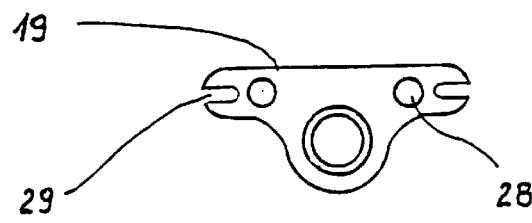

On both sides of the central tool guide bush 11, two carriers 16, preferably of plastic, are secured to the mounting plate 3. One of the two carriers 16 is shown in FIGS. 4 and 5. In a central piece 17, each carrier 16 receives a tool guide 18 for a drilling tool, not shown. Laterally, each carrier 16 has two arms 19, each of which receives one adjusting device 20 and one locking screw 21 for the carrier 16.

Via the carrier 16, the tool guide 18 is adjustable and fixable on the mounting plate 3, specifically for instance along the two legs 22 of a right angle α. Such adjustability is attained by providing one fixation device 23 and 24 each, in the direction of the leg 22 of the angle α and on both sides of each leg 22 on the mounting plate 3. Each fixation device 23 and 24 has a row 25 of bores 26, which either themselves receive pins 27 in a press fit or are designed for slidable and therefore reversible reception of pins 27. The arms 19 of each carrier 16 act as counterparts, which either receive the pins 27 in bores 28 with a press-fit or are designed solely for the slidable reception of pins 27. In the latter case, instead of bores 28 guide slots 29 on the arms 19 may also be used, as shown in FIG. 5.

In this way, the two carriers 16 are adjustable in stages along the legs 22 of the angle α on the mounting plate 3. After the selected adjustment, each carrier 16 is fixed on the mounting plate 3 with the two locking screws 21. Instead of an angle α of 90°, some other angle may also be provided, some other angle may also be provided, such as 45°. For entirely unconventional hinge designs, it may also become necessary to replace the entire mounting plate 3. If this kind of replacement mounting plate is used, the adjustability of the two tool guides 18 can then be dispensed with. In such a case, the tool guides 18 are merely fixed on the mounting plate 3.

Now that the tool guide 18, carried by the carrier 16, has been put in its desired position, a drilling tool, not shown in further detail, can be inserted into each tool guide 18. The two drilling tools have shafts 30 and 31, to which a respective cuff 32 and 33 is secured that serves on the one hand as a bearing face for a respective restoring spring 34 and 35 but on the other also limits a working stroke of the drilling tool downward, by striking against the mounting plate 3 when the restoring springs 34 and 35 are compressed. The cuffs 32 and 33 are adjustable on the shafts 30 and 31 in order to vary the working stroke of their respective drilling tools.

On their top side, each cuff 32 and 33, like the cuff 13, has a respective polygonal recess 36 and 37 for engagement by a corresponding polygonal pin that is connected for drive purposes to a drill spindle of a drilling machine. These latter conditions are not shown, either.

For free access through and adjustability of the two tool guides 18 and the respective drilling tool, two oblong slots 40 (see FIG. 2) are provided in the mounting plate 3. The axes of the two oblong slots 40 extend precisely along the two legs 22 of the angle α. Laterally beside each of the two oblong slots 40 is a respective pair of narrower oblong slots 41, each of which is engaged by a respective pair of locking screws 21 for the two carriers 16.

In the same view from below, the respective rows 25 of bores 26 and pins 27 of the two adjusting devices 20 can also be seen; the rows 25 extend parallel to the legs 22 of the angle α. If in very similar hinges the bores 26 for the pins 27 have to be quite close together, then the possibility also exists of breaking out of the row 25 and disposing individual bores 26 outside the row 25. Then, however, when the drilling device is refitted for such different hinges, the carriers 16 must also be replaced with different carriers, in which the bores 26 and/or pins 27 are spaced correspondingly differently from one another.

Figure 1:
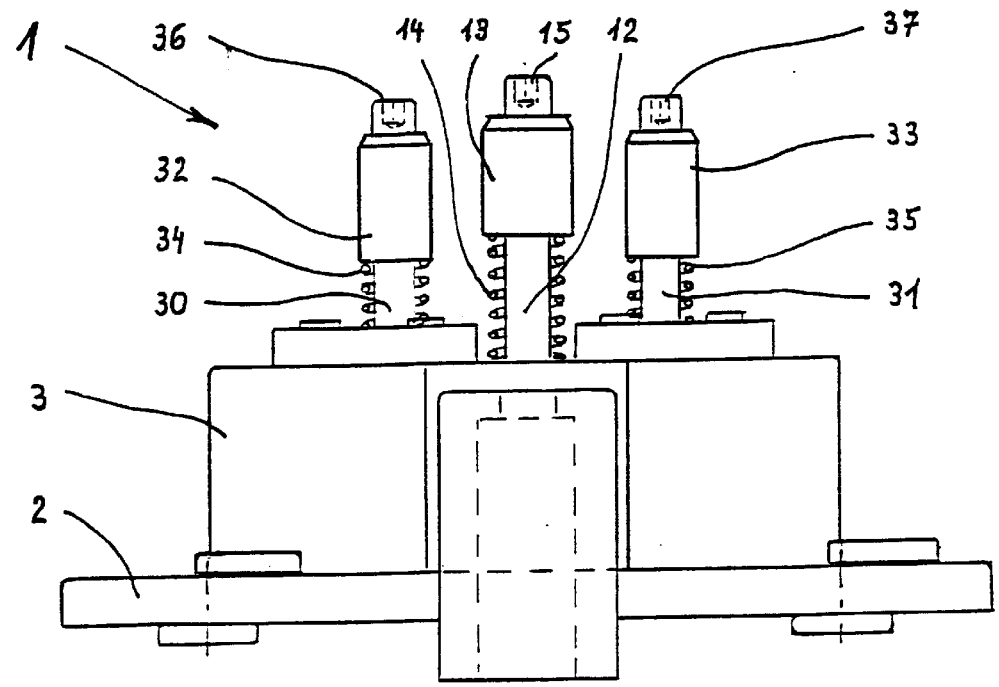
Figure 2:
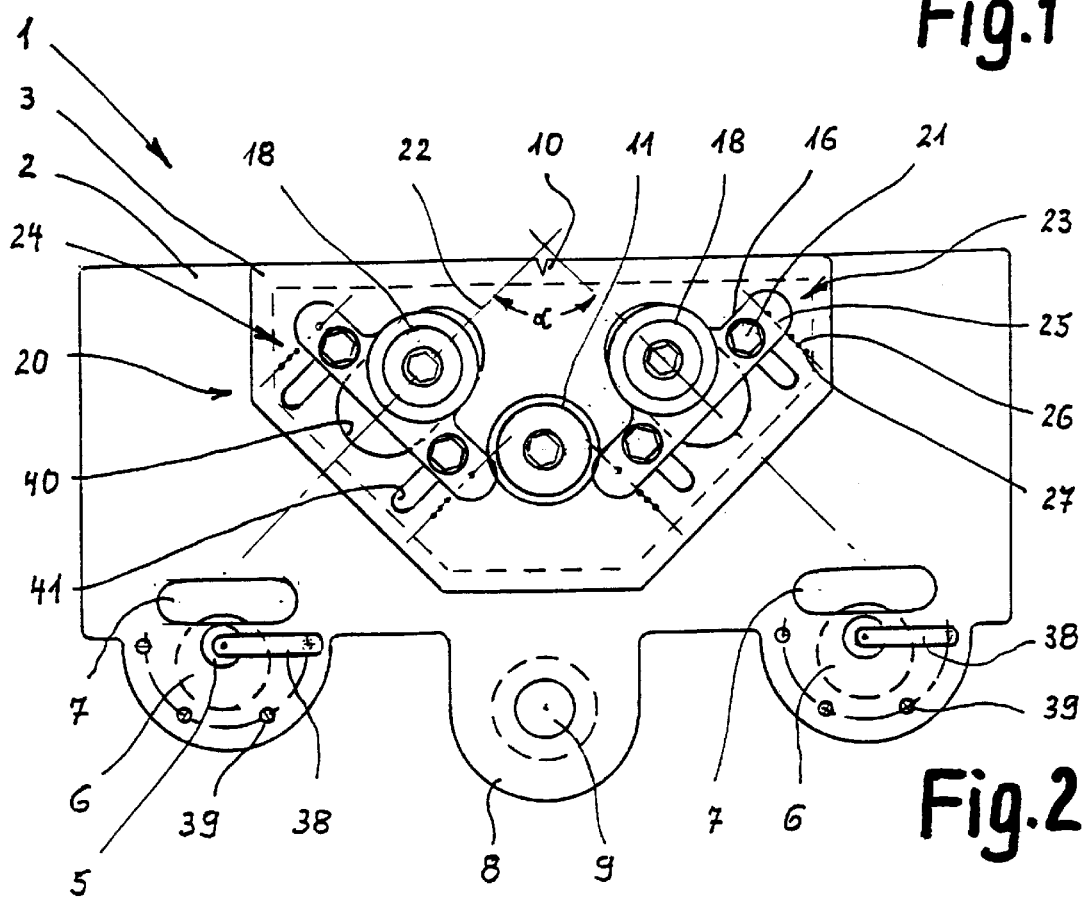

In FIG. 2, two adjusting levers 38 and two markings 39 can also be seen, which are made on the base plate 2 and belong to the adjusting eccentrics 6.

MODE OF OPERATION

Before the main bore for the central body of the hinge and the two insertion bores for the hinge fastening screws are made, the drilling device 1 must first be set up for the applicable type of hinge and the applicable spacing of the hinge from an edge of a door or the like.

To that end, first, the adjusting eccentrics 6 are adjusted in the bores 5. In this process, the adjusting levers 38 of the adjusting eccentrics 6 slide along the markings 39. Each individual marking 39 is assigned a number, which corresponds to an applicable change of the spacing in millimeters of the main bore and the two screw holes for the hinge from the edge of the door or the like. Otherwise, however, the two adjusting eccentrics 6 are adjustable in an infinitely graduated fashion. The correct position of the two adjusting eccentrics 6 can be checked through the monitoring windows 7.

Next, the two carriers 16 are inserted in reverse on the pins 27 and/or the guide slots 29, by means of the adjusting device 20 and the fixation devices 23 and 24, and fixed by the locking screws 21, in such a way that the particular design of the hinge is properly taken into account.

Finally, the base plate 2 together with the mounting plate 3 are aligned, by means of the adjusting notch 10 made on the base plate 2, and then the entire drilling device 1 is firmly clamped to the workpiece to be machined, via the chucking device, not shown, disposed in the receiving bore 9.

Whatever drilling depth is desired is set with the aid of the cuffs 13, 32, 33 that are adjustable on the shafts 12, 30, 31. The drilling device 1 is now ready for use, and both the main bore for the central body of the hinge and the two screw holes for the hinge fastening screws can be drilled quickly and cleanly in a single operation.

Figure 6:
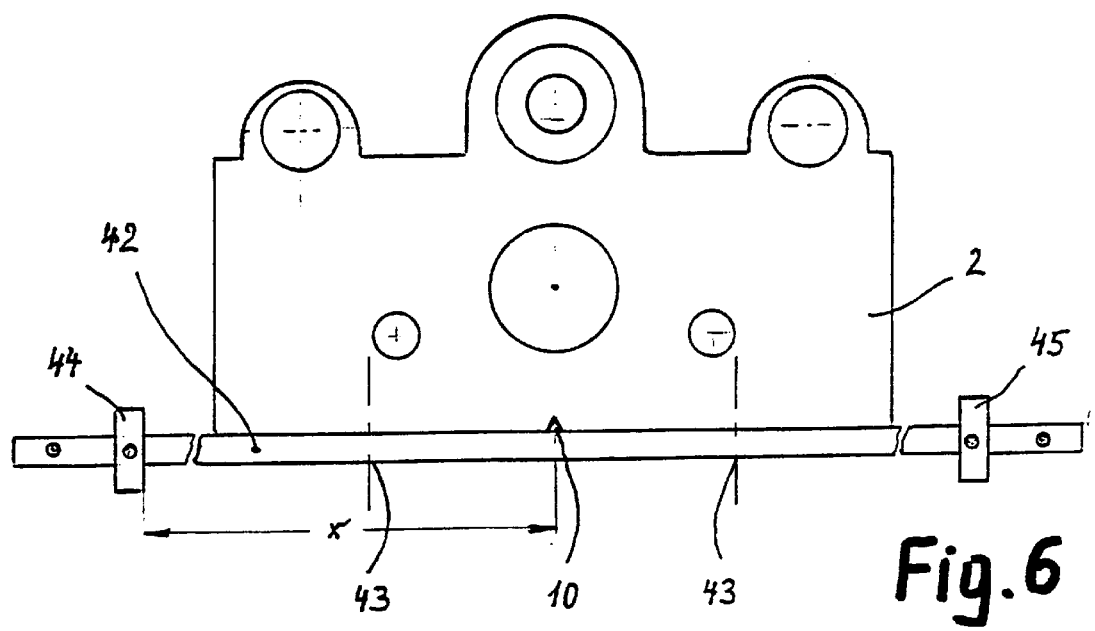

In a further feature of the invention, for locating the main bore for the central body of the hinge along with the two associated screw holes for the hinge fastening screws on the leaf of the door—as FIG. 6 shows—a stop rod 42 is used, which can be secured for instance by means of screws 43 to the base plate 2, shown here merely in simplified from, and which—beginning at the adjusting notch 10 made on the base plate 2—fixes an equal spacing, for instance of 100 mm (dimension x) of each hinge from one or the other edge of the door toward both sides with regard to the upper and lower edges of the door, doing so specifically by means of two stops 44 and 45. These stops 44 and 45 are disposed adjustably, for instance bidirectionally, on the stop rod 42 in order to vary the dimension x, for instance to change it to 125 mm, or the like.

Figure 7:
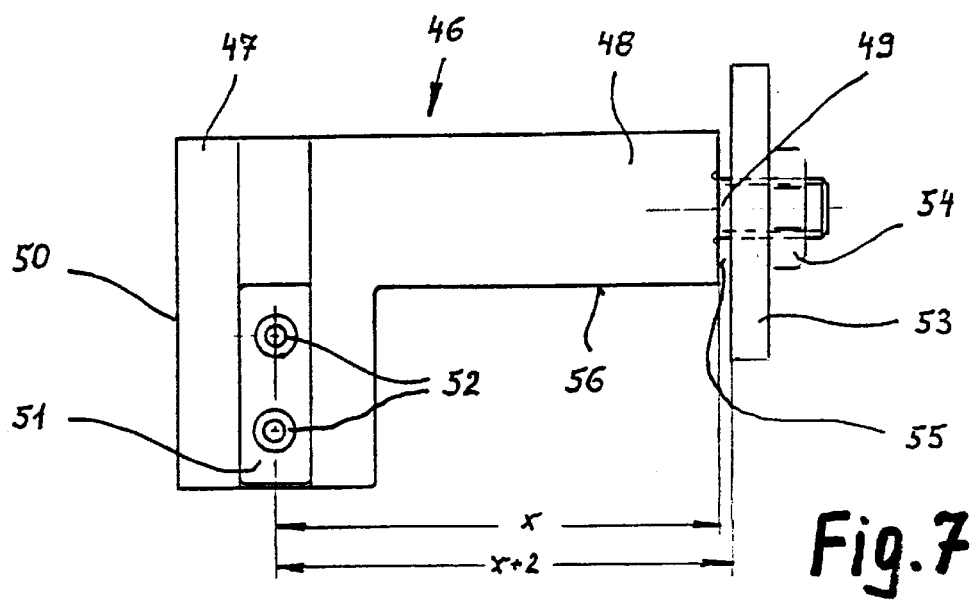
Figure 8:
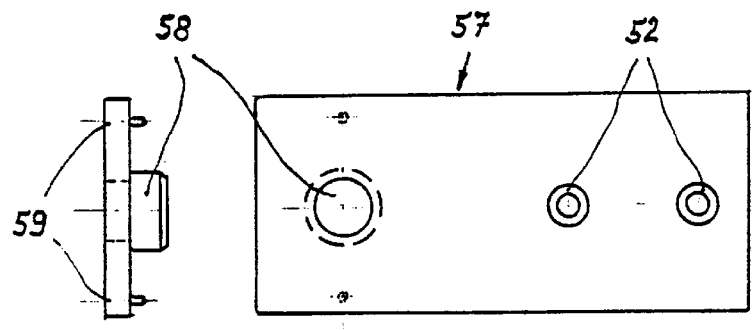

To enable readily ascertaining the disposition of the fastening holes for screwing the hinge arm to the cupboard, in a further feature of the invention a drilling aid of the kind shown in FIGS. 7 and 8 is used. Such a drilling aid 46 for instance has an angle unit 47, one leg 48 of which carries a tang with a thread 49 and the other leg 50 of which carries a drill bush holder 51. A stop 53 can be screwed on the threaded tang 49 and fixed by means of a check nut 54. The leg 48 that has the threaded tang 49 also has a plane face 55, as a face of origin for the dimension x.

An inner edge 56 of the leg 50 serves as a basis for a depth dimension, such as 37 mm, for the spacing of a first bore for the fastening holes in the cupboard, and a second bore has a spacing of 32 mm, for instance, from the first bore. For making these two bores, the leg 50 carries the drill bush holder 51. However, since both the depth dimension of 37 mm and the spacing dimension of 32 mm can also be selected in some other size, the drill bush holder 51 is interchangeably secured to the leg 50, for instance in a dovetail receptacle, and can then be replaced by a drill bush holder with different spacing dimensions.

The mode of operation of the drilling aid 46 is such that with it the dimension x, such as 100 mm, is fixed. To drill the hinge arm fastening holes in the cupboard, care must now be taken that the cupboard must protrude by a slight extent, such as 2 mm, past the top and bottom of the door. To set the drilling aid 46 accordingly, the stop 53 is adjusted by two revolutions, or in other words 2·1 mm=2 mm, so that the dimension x is increase by 2 mm, to 102 mm. The stop 53 is then fixed with the check nut 54. The fastening holes can now be made in the cupboard.

However, there are also doors, for instance of bedroom cupboards, that have a considerable height or length, for instance of more than 2 mm. Such doors are then equipped with more than two hinges, for instance with four hinges. For mounting the inner hinges, it is unnecessary to maintain a selected spacing from the upper and lower edge of the door, respectively. Therefore according to the invention, after the main bore and the two fastening bores for the central body of the hinge have been drilled with the drilling device 1, a drilling aid 57 is used, of the kind shown in side and back views in FIGS. 8. This drilling aid 57 has a cylindrical extension 58, which is inserted into the main bore made beforehand in the door with the drilling device 1. The drilling aid 57 has a rectangular, shallow body which on one side carries the cylindrical extension 58 with two alignment pins 59 and on its other side carries the two drill bushes 52, of the kind that the drilling aid 46 also has. These two drill bushes 52 likewise have a spacing of 32 mm from one another, for instance, and are intended to make the fastening bores for the arm of the hinge in the cupboard. It is readily apparent that the two drill bushes 52 in this drilling aid 57 can likewise be disposed interchangeably. Mounting the inner hinges is then facilitated substantially with such a drilling aid 57.

With the drilling device 1 of the invention, a craftsman, in particular a cabinetmaker, is furnished with a drilling aid that enables him to use various hinge forms and mounting appropriately, by placing the drilling device 1 on the workpiece to be machined in accordance with the desired specification, so that the central bore and the two screw holes are easy to make. Once the drilling device 1 has been adjusted and fixed on the workpiece, the craftsman introduces one pin, secured in a chuck of a drilling machine, into each of the three polygonal recesses 15, 36, 37, and he can then make both the central bore and the two screw holes in the workpiece in a single chucking operation.

LIST OF REFERENCE NUMERALS

1 Drilling device
2 Base plate
3 Mounting plate
4 Screws
5 Bore
6 Adjusting eccentric
7 Monitoring window
8 Protrusion
9 Receiving bore
10 Adjusting notch
11 Tool guide bush
12 Shaft
13 Cuff
14 Restoring spring
15 Polygonal recess
16 Carrier
17 Central piece
18 Tool guide
19 Arms
20 Adjusting device
21 Locking screw
22 Leg
23 Fixation device
24 Fixation device
25 Row
26 Bores
27 Pins
28 Bores
29 Guide slots
30 Shaft
31 Shaft
32 Cuff
33 Cuff
34 Restoring spring
35 Restoring spring
36 Polygonal recess
37 Polygonal recess
38 Adjusting lever
39 Markings
40 Oblong slots
41 Oblong slots
42 Stop rod
43 Screws
44 Stop
45 Stop
46 Drilling aid
47 Angle unit
48 Leg
49 Thread
50 Leg
51 Drill bush holder
52 Drill bushes
53 Stop
54 Check nut
55 Plane surface
56 Inner edge
57 Drilling aid
58 Cylindrical extension
59 Aligning pins

I claim:

1. A drilling device (1) for a swingable body, to which hinges are attached to enable swinging motion thereof, such hinges having a cup-shaped central portion and two drilled-through fastening arms extending therefrom adapted to receive hinge fastening screws, wherein the drilling device comprises:

a central drilling tool guide (11) adapted to accommodate a drilling tool for producing a central bore on the swingable body sized to receive the cup-shaped central portion of the hinge, and two lateral drilling tool guides (18) connected to the central drilling tool guide on each side thereof, respectively, and adapted to accommodate drilling tools for producing screw holes in the swingable body for the hinge fastening screws, wherein the two lateral drilling tool guides (18) each have a respective carrier (16), which receives the tool guide in a central piece (17) and is provided with two lateral arms (19), whereby the central bore and the screw holes are drilled in a single setup and alignment operation of the drilling device on the swingable body.

2. The drilling device of claim 1, wherein the central drilling tool guide and the lateral drilling tool guides are located in a fixed position in the drilling device.

3. The drilling device of claim 1, further comprising a mounting plate, and wherein the central drilling tool guide is located in a fixed position on the mounting plate, and the lateral tool guides are secured to the mounting plate at a selected one from among a plurality of available positions.

4. The drilling device of claim 3, wherein the two lateral drilling tool guides (18) are adjustable and fixable in stages.

5. The drilling device of claim 3, wherein the two lateral drilling tool guides (18) are adjustable and fixable on the mounting plate (3) along two legs (22) of an angle α.

6. The drilling device of claim 5, wherein the angle α is a right angle of 90°.

7. The drilling device of claim 5, wherein each said carrier (16) receives one adjusting device (20) and one locking screw (21) and wherein in the mounting plate (3), in the direction of the two legs (22) of the angle (α), one row each (25) of bores (26) is provided, both of which are intended for the adjusting insertion of the adjusting device (20).

8. The drilling device of claim 3, wherein the mounting plate (3) is secured to a base plate (2), which is provided with two bores (5), spaced apart from one another by a relatively great distance, for receiving two adjusting eccentrics (6); wherein the two bores (5) are provided with monitoring windows (7) so that the setting of the adjusting eccentrics (6) can be checked at a given time; and wherein a receiving bore (9) for a chucking device of the drilling device (1) is provided on the base plate (2), between the two adjusting eccentrics (6).

9. The drilling device of claim 8, further comprising an adjusting notch (10) for alignment with the workpiece and mounted on the base plate (2).

10. The drilling device of claim 9, further comprising a stop rod (42) mounted on the base plate (2) extendable to both sides from the central adjusting notch (10), to fix a mean spacing (dimension x) of the bores to be made from a respective one of the two end edges of the swingable body by means of adjustable stops (44 and 45).

11. The drilling device of claim 1, wherein the drilling tool received in the central drilling tool guide (11), and the two drilling tools respectively received in the lateral drilling tool guides (18) are provided with cuffs (13, 32, 33) on their shafts (12, 30, 31), which cuffs are each subject to a force of a respective restoring spring (14, 34, 35); wherein the cuffs (13, 32, 33) on the shafts (12, 30, 31) are disposed adjustably and lockably to limit a drilling depth of the drilling tools into the swingable body; and wherein the drilling tools are each provided with a respective polygonal recess (15, 36, 37) on their cuffs (13, 32, 33) for force introduction, which polygonal recesses are adapted to be engaged by polygonal pins driven via drill spindles.

\* \* \* \* \*

UNITED STATES PATENT AND TRADEMARK OFFICE
CERTIFICATE OF CORRECTION

PATENT NO. : 6,077,001
DATED : June 20, 2000
INVENTOR(S) : Gerhard FETZER

It is certified that error appears in the above-identified patent and that said Letters Patent is hereby corrected as shown below:

Title page,
Delete "Item [73] Assignee: Johann Eberhard GmbH, St. Josef, Austria".

Signed and Sealed this

Twenty-second Day of May, 2001

Attest:

NICHOLAS P. GODICI

Attesting Officer

Acting Director of the United States Patent and Trademark Office